Patented Jan. 22, 1952

2,583,325

UNITED STATES PATENT OFFICE 2,583,325

ACRYLONITRILE ITACONIC MONOESTER COPOLYMERS

Gaetano F. D'Alelio, Pittsburgh, Pa., assignor to Koppers Company, Inc., a corporation of Delaware No Drawing. Application January 6, 1949, Serial No. 69,621

24 Claims. (Cl. 260—78.5)

This invention relates to new copolymers of acrylonitrile. More specifically, it is related to the polymerization products of polymerizable masses comprising acrylonitrile and a monester of itaconic acid polymerized in the presence or absence of other monoethylenic copolymerizable compounds. This invention also deals with compositions of these copolymers adapted to the formation of shaped articles, in many cases to molecularly oriented shaped articles, particularly to fibers, threads, bristles, monofilaments, etc., hereinafter referred to as fibers, and other shaped articels such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions of dispersions of dyes. It has been proposed that improvement in dye susceptibility can be obtained by the use of itaconic acid in small amounts as a copolymerizing monomer in the preparation of acrylonitrile polymers. However, the polymer products obtained thereby have a tendency to crosslink upon standing at temperatures of at least about 70–80° C. or upon spinning from hot solutions. Such cross-linking causes spoliation of material by gelation during storage, embrittlement of fibers, fouling of spinning jets, and other production difficulties.

It has now been found that this crosslinking may be minimized and that improvements in dyeing properties of acrylonitrile polymers may be effected by a process of preparing acrylonitrile copolymers in which a monoester of itaconic acid is used as a copolymerizing reagent in a polymerizable composition comprising monomeric acrylonitrile. The polymerizable composition may contain any number of other copolymerizable ethylenic compounds.

Itaconic monoesters used in the practice of the present invention have the formula

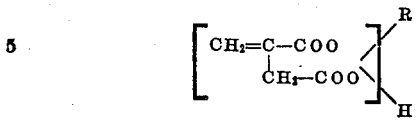

wherein R is an alkyl, aryl, alkylaryl, aralkyl, cyclo-aliphatic group, or halogen-, acyloxy-, or alkoxy-substituted derivative thereof, and wherein the R group may be substituted on either of the acid groups. In general, the formula embraces itaconic monoesters of an esterifiable monohydroxy compound. Illustrative examples of radicals represented by R in the above formula are: methyl, ethyl, propyl, isopropyl, butyl, isobutyl, secondary-butyl, tertiary-butyl, amyl, hexyl, decyl, chloromethyl, chloroethyl, cyclohexyl, methyl-cyclopentyl, propyl-cyclopentyl, amyl-cycopentyl, methyl-cyclohexyl, dimethyl-cyclohexyl, phenyl, chloro-phenyl, xenyl, naphthyl, tolyl, xylyl, ethyl-phenyl, propyl-phenyl, isopropyl-phenyl, benzyl, phenethyl, phenyl-propyl, phenyl-butyl, acetoxy-ethyl, chlorophenoxy-ethyl, acetoxy-propyl, acetoxy-isopropyl, methoxy-propyl, ethoxy-propyl, etc.

For reasons of economy and ease of preparation, the methyl monoester of itaconic acid is usually preferred. This monoester is prepared simply by refluxing methanol with itaconic acid in the presence of small amounts of an esterification catalyst such as sulfuric acid, toluene sulfonic acid, cation-exchange resins containing sulfonic acid groups, etc.

Although even smaller amounts are somewhat effective, the improvement in dye susceptibility of acrylonitrile copolymers becomes particularly noticeable when itaconic monoester is present in the copolymer at concentrations of about 0.1 percent and the dye susceptibility increases as the amount of monoester in the copolymer is increased. However, even though amounts of itaconic monoester up to 5 percent can effect sufficient improvement in dye susceptibility, it may be advantageous for various reasons, such as in the preparation of oil-resistant polymers, to have a major proportion of itaconic monoester in the copolymer.

The copolymers of this invention show great affinity toward many dyes, especially basic dyes and cellulose acetate dyes. Basic dyes containing amino groups, both substituted and unsubstituted, are particularly effective. It appears that the acid groups of the copolymers become attached to the amino groups of the dye molecules by chemical reaction or salt formation, thereby giving fast and more lasting properties to the dyed products.

In addition to the improvements effected in the resultant copolymers, the use of an itaconic monoester has certain other advantages over the use of itaconic acid. For example, the monoesters are more soluble in acrylonitrile and more insoluble in water than is itaconic acid. Thus, it is generally easier to get complete copolymerization of the monoester with acrylonitrile in emulsion and suspension polymerizations. Therefore, the acid numbers of the resultant copolymers more nearly approach the theoretical value than in the itaconic acid-acrylonitrile copolymers. This condition is emphasized even more when the ester group is large and more water-insoluble.

The acrylonitrile copolymers discussed herein are soluble in N,N-dimethyl acetamide (DMA), N,N-dimethyl formamide (DMF) and a number of similar solvents, used alone or in conjunction with N,N-dimethyl cyanamide, N,N-dimethyl cyanoacetamide, N,N-dimethyl methoxy-acetamide, methylene dinitrile, methylene di-thiocyanate, formyl caprolactam, formyl morpholine, tetramethylene sulfone, etc. Tetra-alkyl ureas of the formula $(CH_3)_2NC(O)NRR'$ can also be used as solvents, in which formula R and R' are methyl, ethyl, propyl, isopropyl, etc. Solvents of this latter type, such as N,N,N',N'-tetramethyl urea (TMU), are disclosed in the applicant's copending application, Serial Number 187,689, filed September 29, 1950. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

*Example I*

Five polymers of acrylonitrile are prepared from the following monomer compositions:

| Acrylonitrile | Monomethyl Itaconate | Copolymer Soluble In |
|---|---|---|
| Parts | Parts | |
| 100 | ---- | DMA, DMF, TMU, etc. |
| 99.9 | 0.1 | DMA, DMF, TMU, etc. |
| 95 | 5.0 | DMA, DMF, TMU, etc. |
| 90 | 10.0 | DMA, DMF, TMU, etc. |
| 80 | 20.0 | DMA, DMF, TMU, etc. |

The 100 parts of monomer or monomer mixture is, in each case, slowly added over a period of less than an hour to 750–1000 parts of distilled water at 30–50° C. containing dissolved therein 0.6 to 1 part of ammonium persulfate, 0.6 to 1.5 parts of sodium bisulfite, and 0.5 part of sodium dodecyl-benzene sulfonate. The reaction is continued for 1–3 hours, as which time a yield of about 90 percent solid polymer is precipitated. The resulting polymers have molecular weights over 10,000 and acid numbers approximately theoretical. Each polymer is dissolved in N,N-dimethyl acetamide or tetramethyl urea and a film cast from each solution.

A solution of methylene blue dye (a basic dye) is prepared by making a paste of the dye with 1 percent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the monomethyl itaconate copolymers are a deep and dense shade. Identical films, cold-drawn and heat-treated, show dyeing characteristics similar to the undrawn films.

Fibers are spun from the same N,N-dimethyl acetamide or tetramethyl urea solutions either by dry spinning, or by wet spinning into glycerine baths. The fibers are substantially freed from solvent and dried. After cold-drawing the dried fibers 600–800 percent at 130–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the monomethyl itaconate copolymer fibers.

Instead of the monomethyl intaconate ester of the above example, various other monoesters of itaconic acid may be used, such as the ethyl, propyl, isopropyl, butyl, isobutyl, tertiary-butyl, hexyl, tolyl, phenyl, naphthyl, cyclopentyl, cyclohexyl, benzyl, phenethyl monoesters of itaconic acid.

*Example II*

The procedure of Example I is repeated for the polymerization of the following monomer compositions:

| | Acrylonitrile | Vinyl Chloride | Monomethyl Itaconate | Copolymer Suluble In |
|---|---|---|---|---|
| | pt. | pt. | pt. | |
| A | 92 | 5 | 3 | DMF, DMA, TMU, etc. |
| B | 87 | 10 | 3 | DMF, DMA, TMU, etc. |
| C | 82 | 15 | 3 | DMF, DMA, TMU, etc. |
| D | 77 | 20 | 3 | $NO_2Me$. |
| E | 57 | 40 | 3 | Do. |
| F | 37 | 60 | 3 | Acetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example I.

Example III

The procedure of Example I is repeated for the polymerization of the following monomer compositions:

| Acrylonitrile | Styrene | Monomethyl Itaconate | Copolymer Soluble In |
|---|---|---|---|
| pt. | pt. | pt. | |
| 89.5 | 10 | 0.5 | DMF, DMA, TMU, etc. |
| 79.5 | 20 | 0.5 | NO₂Me. |
| 69.5 | 30 | 0.5 | Do. |
| 59.5 | 40 | 0.5 | Do. |

Dyeing tests of these copolymers show improvements in dye susceptibility similar to Example I. In place of styrene, various styrene derivatives may be used, such as alpha-methyl-styrene; nuclear-substituted chloro-styrenes, i. e., ortho-, meta-, and para-chlor-styrenes, dichloro-styrenes, for example the 2,3-, 2,4-, 2,5-, 2,6-, 3,4-, and 3,5-dichloro-styrenes, trichloro-styrenes; cyano-styrenes, such as ortho-, meta- and para-cyano-styrenes, dicyano-styrenes; nuclear-substituted alkyl-styrenes, such as mono- and dimethyl-styrenes, mono- and di-ethyl-styrenes, mono- and di-isopropyl-styrenes; aryl-substituted styrenes, i. e. para-phenyl-styrene, etc.; cycloaliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta-, and para-trifluoromethyl-styrenes, di-(trifluoromethyl)-styrenes; and various other styrenes or mixtures of any number of these with each other or with styrene.

Example IV

The procedure of Example I is repeated for the polymerization of the following monomer compositions:

| Acrylonitrile | Vinylidene Chloride | Monomethyl Itaconate | Copolymer Soluble In |
|---|---|---|---|
| Pt. | Pt. | Pt. | |
| 85 | 10 | 5 | DMF, DMA, TMU, etc. |
| 65 | 30 | 5 | DMF, DMA, TMU, etc. |
| 45 | 50 | 5 | DMF, DMA, TMU, etc. |
| 25 | 70 | 5 | DMF, DMA, TMU, etc. |
| 5 | 90 | 5 | DMF, DMA, TMU, etc. |

With the above vinylidene chloride copolymers and similar copolymers having a total of acrylonitrile an vinylidene chloride of at least 85 percent in the polymer molecules, only the more active solvents, such as N,N-dimethyl acetamide, N,N-dimethyl formamide, N,N,N',N'-tetramethyl urea, etc., can be used as solvents. The above copolymers dye more readily and thoroughly than similar copolymers containing no itaconic monoester.

Example V

The procedure of Example I is repeated for the polymerization of the following monomer compositions:

| Acrylonitrile | Vinylidene Chloride | Vinyl Chloride | Monomethyl Itaconate | Copolymer Soluble In |
|---|---|---|---|---|
| Pt. | Pt. | Pt. | Pt. | |
| 80 | 10 | 8 | 2 | DMF, DMA, TMU, etc. |
| 70 | 20 | 8 | 2 | DMF, DMA, TMU, etc. |
| 70 | 15 | 13 | 2 | DMF, DMA, TMU, etc. |
| 50 | 20 | 28 | 2 | NO-Me, etc. |
| 20 | 18 | 60 | 2 | Acetone. |

The dyeing tests of the copolymer products show dye susceptibilities similar to the copolymers of Example I.

The copolymers of the present invention have a plurality of repeating units of the formulas

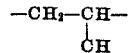

and

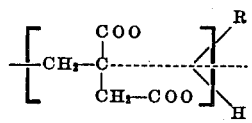

where R is an alkyl, aryl, alkylaryl, aralkyl, cycloaliphatic group or a halogen-, acyloxy-, or alkoxy derivative thereof. In addition, the copolymers may contain any number of repeating units of the type obtained by the copolymerization of acrylonitrile and itaconic monoester with one or more copolymerizable ethylenic compounds, such as, for example, vinylidene chloride, vinyl chloride, styrene, alpha-methyl-styrene, methacrylonitrile, fumaronitrile, beta-cyano-acrylomide and methyl beta-cyano-acrylate.

As previously indicated, the solvent resistance of such copolymers as contain one or more monomer units in addition to those formed by the acrylonitrile and the itaconic monoester is affected by the type and proportion of copolymerizing monomer or monomers used to replace part of the acrylonitrile. For example, copolymers containing small amounts of itaconic monoester units may contain various proportions of such monomer units as obtained from vinylidene chloride, methacrylonitrile, fumaronitrile, and beta-cyano-acrylomide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-itaconic monoester copolymer will be decreased much more when a monomer having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds which may also be present in the polymerizable masses for copolymerization with acrylonitrile and itaconic monoester include one or more of the following: acrylates, e. g. methyl acrylate; methacrylates, e. g. methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and substituted styrenes as listed in Example III; etc.

The copolymers of this invention may be prepared by various polymerization systems, such as emulsion, suspension, mass and solution polymerizations. In addition to the monomers, the polymerizable mass may also contain other materials such as catalysts, e. g. peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., persulfates, such as ammonium persulfate, etc., solvents, suspension or emulsion media, emulsifying agents, suspension agents, plasticizers, lubricants, etc.

For use in the preparation of shaped articles, the copolymers of this invention have molecular weights preferably of at least about 10,000. However, copolymers of molecular weights less than 10,000 may be used for other purposes, such as impregnants, solvent resistant coatings, etc. The molecular weight of the copolymers is dependent on the concentration of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for N,N-dimethyl acetamide, N,N,N',N'-tetramethyl urea, and other solvent compositions of these copolymers. The extruded fibers, from which substantially all of the solvent has been removed in the spinning step, about 1–10 percent remaining in the shaped article, may then be cold-drawn about 100–600 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented, especially if there is no more than 15% itaconic monoester in the polymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the monoester, the proportion of acrylonitrile in the copolymers may be much less than 85 percent without destroying the capacity for molecular orientation. Molecularly oriented, cold-drawn, shaped articles of particular usefulness are prepared from copolymer compositions containing in the polymer molecule 60–99.9 percent acrylonitrile, 0.1–5 percent monomethyl itaconate, with or without one or more monomers of the class consisting of vinylidene chloride, vinyl chloride, styrene, alpha-methyl-styrene, methacrylonitrile, fumaronitrile, beta-cyanoacrylamide and methyl beta-cyano-acrylate, the effects of the presence of the monomers of this class being noticeable when the monomer is present in the polymer molecule in amounts of 1 percent or more.

The basic dyestuffs toward which these copolymers show great affinity are preferably those which contain amido, alkylamido or ammonium groups, such as $-NH_2$, $-N(CH_3)_2$, $-N(C_2H_5)_2$, $-NHC_6H_5$, $-N(CH_3)_3OH$, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these copolymers are mainly amino-anthraquinone derivatives, basic azo compounds and other basic substances, such as the Duranol, Dispersol, Sericol, etc. dyestuffs.

From the molecularly orientable copolymers of this invention fibers may be prepared having dyeing properties, low shrinkage in boiling water, sometimes as low as 3 to 5 percent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

What is claimed is:

1. A copolymer containing in the polymer molecule a plurality of repeating units having the formulas

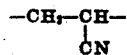

and

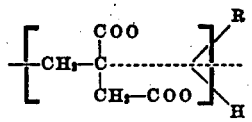

where R is a radical of the class consisting of alkyl, aryl, alkylaryl, aralkyl, cycloaliphatic radicals and halogen-, acyloxy-, and alkoxy-substituted derivatives of alkyl and aryl radicals, said copolymer having between about 60 and 99.9 percent by weight of units of the former formula and between about 0.1 and 40 percent by weight of units of the latter formula.

2. A copolymer of claim 1 in which R is the methyl radical.

3. A copolymer containing in the polymer molecule a plurality of repeating units having the formulas

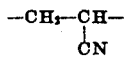

and

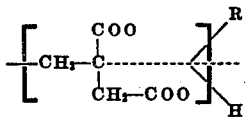

where R is a radical of the class consisting of alkyl, aryl, alkylaryl, aralkyl, cycloaliphatic radicals and halogen-, acyloxy-, and alkoxy-substituted derivatives of alkyl and aryl radicals, and between about 1 percent and 39.9 percent by weight of units of at least one other type isomeric with and formed by polymerization of members of the class consisting of vinyl chloride, vinylidene chloride, styrene, alpha-methyl-styrene, methacrylonitrile, fumaronitrile, beta-cyano-acrylamide and methyl beta-cyano-acrylate, said copolymer having between about 60 and 98.9 percent by weight of units of the former formula and between about 0.1 and 39 percent by weight of units of the latter formula.

4. A copolymer of claim 3 in which the R radical is methyl.

5. A composition of matter comprising the polymerization product of a polymerizable mass comprising acrylonitrile and an alkyl monoester of itaconic acid, said polymerization product containing between about 60 and 99.9 percent by weight acrylonitrile and between about 0.1 and 40 percent by weight of said monoester.

6. A composition of matter comprising the polymerization product of a polymerizable mass comprising acrylonitrile and monomethyl itaconate, said polymerization product containing between about 60 and 99.9 per cent by weight acrylonitrile and between about 0.1 and 40 percent by weight monomethyl itaconate.

7. A composition of matter comprising the polymerization product of a polymerizable mass comprising acrylonitrile, an alkyl monoester of itaconic acid, and at least one member of the class consisting of vinyl chloride, vinylidene chloride, styrene, alpha-methyl-styrene, methacrylonitrile, fumaronitrile, beta-cyano-acrylamide and methyl beta-cyano-acrylate, said polymerization product containing between about 60 and 98.9 percent by weight of acrylontrile, between about 0.1 and 39 percent by weight of said monoester and a total of between about 1 and 39.9 percent by weight of at least one member of said class.

8. A composition of matter of claim 7 in which the monoester of itaconic acid is monomethyl itaconate.

9. A composition of matter comprising N,N,N',N'-tetra-methyl urea and a copolymer of acrylonitrile and a monohydric alcohol monoester of itaconic acid, said monohydric alcohol having the formula ROH where R is a radical of the class consisting of alkyl, aryl, alkylaryl, aralkyl, cycloaliphatic radicals and halogen-, acyloxy-, and alkoxy-substituted derivatives of alkyl and aryl radicals, and said copolymer containing in the polymer molecule between about 60 and 98.9 percent acrylonitrile and between about 0.1 and 40 percent by weight of said monoester.

10. A composition of matter of claim 9 in which the monoester of itaconic acid is monomethyl itaconate.

11. A composition of matter comprising N,N,N',N'-tetra-methyl urea and a copolymer of acrylonitrile, a monohydric alcohol monoester of itaconic acid, said monohydric alcohol having the formula ROH where R is a radical of the class consisting of alkyl, aryl, alkylaryl, aralkyl, cycloaliphatic radicals and halogen-, acyloxy-, and alkoxy-substituted derivatives of alkyl and aryl radicals, and at least one monomer of the class consisting of vinyl chloride, vinylidene chloride, styrene, alpha-methyl-styrene, methacrylonitrile, fumaronitrile, beta-cyano-acrylamide and methyl beta-cyano-acrylate, said copolymer containing between about 60 and 98.9 percent by weight of acrylonitrile, between about 0.1 and 39 percent by weight of said monoester and a total of between about 1 and 39.9 percent by weight of at least one member of said class.

12. A composition of matter of claim 11 in which the monoester of itaconic acid is monomethyl itaconate.

13. A shaped article comprising between about 1% and about 10% N,N,N',N'-tetramethyl urea, and a copolymer of acrylonitrile and a monohydric alcohol monoester of itaconic acid, said monohydric alcohol having the formula ROH where R is a radical of the class consisting of alkyl, aryl, alkylaryl, aralkyl, cycloaliphatic radicals and halogen-, acyloxy-, and alkoxy-substituted derivatives of alkyl and aryl radicals, said copolymer having a molecular weight of at least about 10,000, and said copolymer containing between about 60 and 99.9 percent by weight of acrylonitrile, between about 0.1 and 40 percent by weight of said monoester.

14. A shaped article of claim 13 of which the monoester of itaconic acid is monomethyl itaconate.

15. A shaped article comprising the polymerization product of a polymerizable mass comprising acrylonitrile and a monohydric alcohol monoester of itaconic acid, said monohydric alcohol having the formula ROH where R is a radical of the class consisting of alkyl, aryl, alkylaryl, aralkyl, cycloaliphatic radicals and halogen-, acyloxy-, and alkoxy-substituted derivatives of alkyl and aryl radicals, said polymerization product having a molecular weight of at least about 10,000, and said copolymer containing between about 60 and 99.9 percent by weight acrylonitrile and between about 0.1 and 40 percent by weight of said monoester.

16. A shaped article of claim 15 in which the monoester of itaconic acid is monomethyl itaconate.

17. A cold-drawn shaped article having molecular orientation, said article comprising a copolymer of acrylonitrile and a monohydric alcohol monoester of itaconic acid, said monohydric alcohol having the formula ROH where R is a radical of the class consisting of alkyl, aryl, alkylaryl, aralkyl, cycloaliphatic radicals and halogen-, acyloxy-, and alkoxy-substituted derivatives of alkyl and aryl radicals, said copolymer having a molecular weight of at least about 10,000 and containing in the polymer molecule between about 85 and 99.9 percent by weight of acrylonitrile and between about 0.1 and 15 percent by weight itaconic monoester.

18. A cold-drawn shaped article of claim 17 in which the itaconic monoester is monomethyl itaconate.

19. A cold-drawn shaped article having molecular orientation, said article comprising a copolymer of about 60-98.9 percent by weight acrylonitrile, about 0.1-5 percent by weight monomethyl itaconate and about 1-39.9 percent by weight vinylidene chloride.

20. A cold-drawn shaped article having molecular orientation, said article comprising a copolymer of about 60-98.9 percent by weight acrylonitrile, about 0.1-5 percent by weight monomethyl itaconate and about 1-39.9 percent by weight vinyl chloride.

21. A cold-drawn shaped article having molecular orientation, said article comprising a copolymer of about 60-98.9 percent by weight acrylonitrile, about 0.1-5 percent by weight monomethyl itaconate and about 1-39.9 percent by weight styrene.

22. A composition of matter as in claim 6, which composition also contains a basic dye having amino groups therein.

23. A cold-drawn fiber having molecular orientation, said fiber comprising a copolymer of acrylonitrile and a monohydric alcohol monoester of itaconic acid, said monohydric alcohol having the formula ROH, where R is a radical of the class consisting of alkyl, aryl, alkylaryl, aralkyl, cycloaliphatic radicals and halogen-, acyloxy- and alkoxy-substituted derivatives of alkyl and aryl radicals, said copolymer having a molecular weight of at least about 10,000 and containing in the copolymer molecule between about 85 and 99.9 percent by weight of acrylonitrile and between about 0.1 and 15 percent by weight of itaconic monoester.

24. A cold-drawn fiber of claim 23 in which the itaconic monoester is monomethyl itaconate.

GAETANO F. D'ALELIO.

REFERENCES CITED

The following references are of record in the file of this patent:

UNITED STATES PATENTS

| Number | Name | Date |
| --- | --- | --- |
| 2,279,881 | D'Alelio | Apr. 14, 1942 |
| 2,366,495 | D'Alelio | Jan. 2, 1945 |
| 2,460,578 | Houtz | Feb. 1, 1949 |